(12) United States Patent
Ljubicic et al.

(10) Patent No.: US 9,121,705 B2
(45) Date of Patent: Sep. 1, 2015

(54) SENSOR FOR SIMULTANEOUS MEASUREMENT OF THICKNESS AND LATERAL POSITION OF A TRANSPARENT OBJECT

(71) Applicant: Massachusetts Insititute of Technology, Cambridge, MA (US)

(72) Inventors: Dean Marko Ljubicic, Somerville, MA (US); Brian W. Anthony, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 350 days.

(21) Appl. No.: 13/788,507

(22) Filed: Mar. 7, 2013

(65) Prior Publication Data

US 2013/0278756 A1    Oct. 24, 2013

Related U.S. Application Data

(60) Provisional application No. 61/636,032, filed on Apr. 20, 2012.

(51) Int. Cl.
| | |
|---|---|
| *G01C 11/02* | (2006.01) |
| *G01B 11/06* | (2006.01) |
| *G01B 11/02* | (2006.01) |
| *G01B 9/02* | (2006.01) |

(52) U.S. Cl.
CPC .............. *G01C 11/02* (2013.01); *G01B 11/028* (2013.01); *G01B 11/06* (2013.01)

(58) Field of Classification Search
CPC ...... G01B 11/022; G01B 11/024; H04N 7/18; H04N 7/181; G01C 15/00

USPC ......................................................... 348/135
See application file for complete search history.

(56) References Cited

U.S. PATENT DOCUMENTS

| | | | |
|---|---|---|---|
| 3,185,024 A * | 5/1965 | McCreanor ................... | 118/665 |
| 5,126,946 A | 6/1992 | Ko | |
| 5,748,318 A * | 5/1998 | Maris et al. ................... | 356/630 |

(Continued)

OTHER PUBLICATIONS

Transmittal International Preliminary Report on Patentability for PCT/US2013/037131, mailed on Oct. 30, 2014.

(Continued)

*Primary Examiner* — Sath V Perungavoor
*Assistant Examiner* — Howard D Brown, Jr.
(74) *Attorney, Agent, or Firm* — Sam Pasternack; MIT Technology Licensing Office

(57) ABSTRACT

System for measuring thickness and lateral position of a transparent object. The system includes a camera having a sensor for receiving light, the camera including an objective lens for focusing on an object plane and having an optical axis and a field of view. A source of light is provided to illuminate a surface having variations in reflected light intensity. The surface is spaced apart from the objective lens and disposed at an angle with respect to the optical axis of the objective lens. A transparent object disposed fully or partially between the objective lens and the surface will shift the position of the object plane, the shift in object plane being proportional to the thickness of the object, and the transparent object, when partially inserted between the objective lens and the surface, will focus a fraction of the light on a lower plane, this fraction of light being proportional to the fraction of the lens field of view occupied by the transparent object that is related to lateral position.

7 Claims, 3 Drawing Sheets

(56) References Cited

U.S. PATENT DOCUMENTS

| | | | |
|---|---|---|---|
| 6,289,729 | B1 | 9/2001 | Haque |
| 6,323,948 | B2 | 11/2001 | Haque |
| 7,550,699 | B1* | 6/2009 | Marshall .................... 250/201.4 |
| 2004/0174526 | A1* | 9/2004 | Tang ............................ 356/450 |
| 2011/0080737 | A1* | 4/2011 | Nishiwaki et al. ............ 362/293 |
| 2013/0021461 | A1* | 1/2013 | Zahniser et al. ................ 348/77 |
| 2013/0278756 | A1* | 10/2013 | Ljubicic et al. ............... 348/135 |
| 2014/0016841 | A1* | 1/2014 | Zahniser et al. .............. 382/128 |

OTHER PUBLICATIONS

Raeymakers et al., "Measurement and Sources of Lateral Tape Motion: A Review," Journal of Tribology—Transactions of the Asme 131.1 (2009).

Goldade et al., "Synthetic Light Sensor for Web-Guiding Apparatus." Measurement and Origin of Tape Edge Damage in a Linear Tape Drive. Tribology Letters 14.3 (2003), 167-80.

Seshadri et al., "Design and Development of a New Edge Sensor for Web Guiding." Iees Sensors Journal 7.5-6 (2007), 698-706.

Coppola et al., "Method for Measuring the Refractive Index and the Thickness of Transparent Plates with a Lateral-Shear. Wavelength-Scanning Interferometer." Applied Optics 42.19 (2003): 3882-7.

Fathi et al., "Thickness Measurement of Transparent Plates by a Self-Mixing Interferometer." Optics Letters 35.11 (2010): 1844-6.

Y. Pavan Kumar et al., "Thickness Measurement of Transparent Glass Plates using a Lateral Shearing Cyclic Path Optical Configuration Setup and Polarization Phase Shifting Interferometry." Applied Optics 49.33 (2010): 6552-7.

De Groot., "Measurement of Transparent Plates with Wavelength-Tuned Phase-Shifting Interferometry." Applied Optics 39.16 (2000): 2658-63.

Mansoor., "A Micro-Fabricated Optical Scanner for Rapid Non-Contact Thickness Measurement of Transparent Films." Sensors and Actuators A-Physical 167.1 (2011): 91-6.

Fukano et al., "Simultaneous Measurement of Thickness and Refractive Indices of Multiple Layers by a Low-Coherence Confocal Interference Microscope." Optics Letters 21.23 (1996): 1942-4.

Ri et al., "A Simple Technique for Measuring Thickness Distribution of Transparent Plates from a Single Image by using the Sampling Moire Method." Measurement Science & Technology 21.2 (2010).

Liu et al., "Thickness Measurement System for Transparent Plates using Dual Digital Versatile Disc (DVD) Pickups." Applied Optics 49.4 (2010): 637-43.

* cited by examiner

SENSOR FOR SIMULTANEOUS MEASUREMENT OF THICKNESS AND LATERAL POSITION OF A TRANSPARENT OBJECT

This application claims priority to provisional application Ser. No. 61/636,032 filed on Apr. 20, 2012, the contents of which are incorporated herein by reference.

This invention was made with government support under Grant No. CMM11025020 awarded by the National Science Foundation. The government has certain rights in the invention.

BACKGROUND OF THE INVENTION

This invention relates to thickness and lateral position measurement having particular application to transparent webs in roll to roll manufacturing processes.

Roll to roll manufacturing processes provide high throughput production at economical rates. These processes require accurate positioning an handling of large sheets or "webs" that must be properly unwound, processed, and rewound in a continuous fashion. The accuracy in which the web can be positioned limits the intricacy and complexity of the features able to be manufactured via roll to roll processing. The sensors that measure the properties of the web face additional complications when the webs are made from transparent materials. By improving the sensing capabilities of tools that measure transparent webs, the economic benefit of roll to roll manufacturing processes can be used in a wider variety of applications.

Roll to roll manufacturing hardware must measure and control the position of the web perpendicular to the direction of travel. The precision in which the lateral position of the web can be measured and controlled affects the performance of the roll to roll process. For example, the density of data stored on magnetic tapes is chiefly limited by the fidelity of the spatial registration between the ribbon and the read head [1]. The most common measurement strategy used in industry will sandwich the web between a transmitter and a receiver. As the web moves further into the range of the sensor the received signal becomes attenuated as the transmitted signal becomes blocked. Sensors measuring opaque webs typically use light as the transmitted signal [2-3] while those measuring transparent webs will use sound [4-5]. Due to the greater diffraction of sound waves, ultrasonic sensors exhibit resolution that is poorer than the light based sensors. Seshardi and Pagilla have demonstrated a sensor to measure both mediums [6].

In a variety of industrial roll to roll applications such as coating or extrusion processes it is important to inspect and control the thickness of the web. One prevalent method to measure thickness and index of refraction of transparent plates uses lateral shear interferometery to pass a spatially coherent laser multiple times through a transparent object in order to observe the subsequent interference pattern [7-9]. Other methods observe light reflect from the front and back surface of the transparent object to determine is thickness [10-12]. Although many of these methods are able to simultaneously measure both thickness and index of refraction, it is also common and easier to instead measure their product: the optical path length. With more accurate measurement of thickness the products made by roll to roll processes can be both more intricate and cost effective.

An object of this invention is a sensor that can simultaneously measure a transparent object's optical path length and lateral position with submicron resolution.

SUMMARY OF THE INVENTION

The system according to the invention for measuring thickness and lateral position of a transparent object includes a camera having a sensor for receiving light, the camera including an objective lens for focusing on an object plane and having an optical axis and a field of view. A source of light is provided that need not be spatially or temporally coherent. A surface having variations in reflected light intensity is spaced apart from the object lens and illuminated by the source of light. The surface is disposed at an angle with respect to the optical axis of the objective lens. A transparent object disposed fully or partially between the object lens and the surface will shift the position of the object plane, the shift in object plane being proportional to the thickness of the object. Further, the transparent object, when partially inserted between the objective lens and the surface, will focus a fraction of the light on a lower plane, this fraction of light being proportional to the fraction of the lens field of view occupied by the transparent object and related to lateral position.

In a preferred embodiment, the surface is a Ronchi grating. A suitable Ronchi grating has an alternating black and white striped pattern on its surface. The preferred embodiment further includes, computing apparatus running image processing algorithms operating on the output of the camera sensor to determine the location of the object plane. In this embodiment, the algorithm, when a Ronchi grating column is in focus, will output high or low intensity values corresponding to white or black portions of the grating. The algorithms may use standard deviation of values in each grating column as a metric of focus. In another preferred embodiment, the camera displays two separate peaks of reduced magnitude on a standard deviation plot, the relative magnitude of the two peaks determining lateral position of the object.

DESCRIPTION OF THE PREFERRED EMBODIMENT

Similar to the metrology approach proposed by Ri and Muramatsu on transparent objects [13], our sensor in a preferred embodiment observes changes in intensity on a Ronchi grating illuminated by an LED light source that is neither spatially nor temporally coherent. This light source simplifies the hardware and cuts down on cost.

The sensor detailed in this application takes measurements of a transparent object by using the object as an element in the optical path. A digital camera equipped with a high numerical aperture microscope objective is used to image a known object. The appearance of the known object is altered when the unknown transparent object is inserted into the field of view of the camera. By observing and calculating this alteration the sensor can simultaneously measure the optical path length and lateral position of the unknown transparent object or web with submicron resolution. Our calculations assume the variance in refractive index is negligible enough to use the optical path length interchangeably with thickness.

Figure 1:
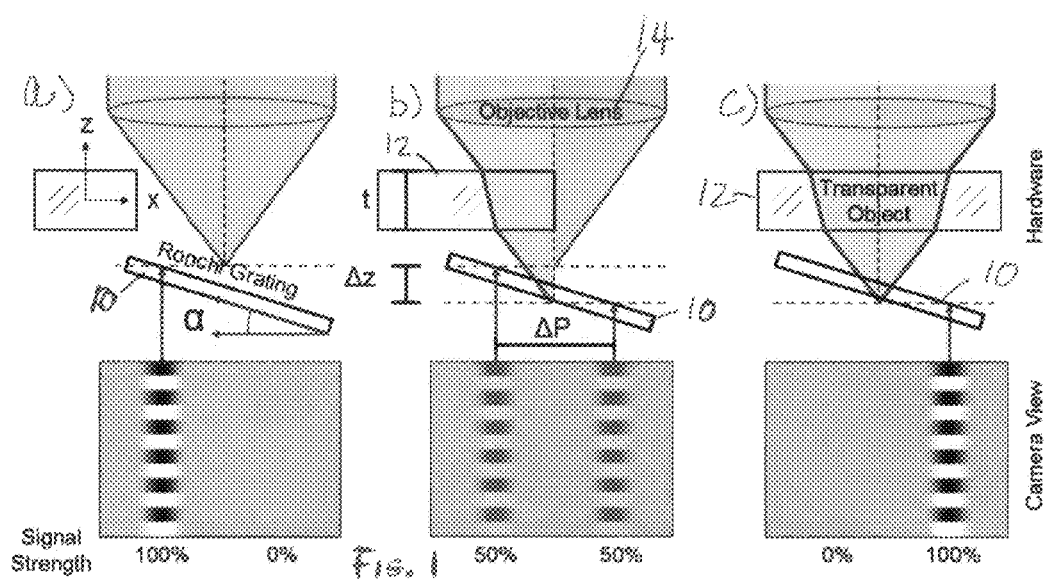
FIGS. 1a, 1b, and 1c are schematic illustrations depicting how light bends about a transparent object that is absent, partially inserted, and fully inserted into a light path, respectively. The thickness of the object is measured by calculating the shift in pixels from the left and right signature while the lateral position is measured by observing their relative signal strength.

The sensor of the invention tracks the position of the object plane in order to make its thickness measurement. Liu, Yeh, and Huang use the same optical principle to measure thickness with optical components from a DVD pickup [14]. A LED light source illuminates a Ronchi grating tilted at an angle α from the horizontal. The Ronchi grating is positioned such that it is intersected by the object plane. Upon this intersection the camera images a pattern of white and black striped lines along its columns while the rest of the CMOS sensor captures a uniform gray. A transparent object with thickness "t" inserted into the field of view will shift the position of the object plane a distance "$\Delta z$." This distance $\Delta z$ is linearly proportional to the thickness of the transparent object. The shift in the object plane causes the camera to image the black and white striped pattern of the Ronchi grating along a different column shifting by a number of pixels "$\Delta P$." The shift in columns on the camera sensor is related to the shift in position of the object plane. The effect of these geometric and imaging principles is summarized in FIG. 1. The arrows point out the intersection of the object plane with the surface of a Ronchi grating 10. A transparent object such as a transparent web 12 in inserted between an objective lens 14 and the Ronchi grating 10. The thickness of the transparent object 12 is measured by calculating a shift in pixels from the left and right signature while the lateral position is measured by observing their relative signal strength.

Figure 2:
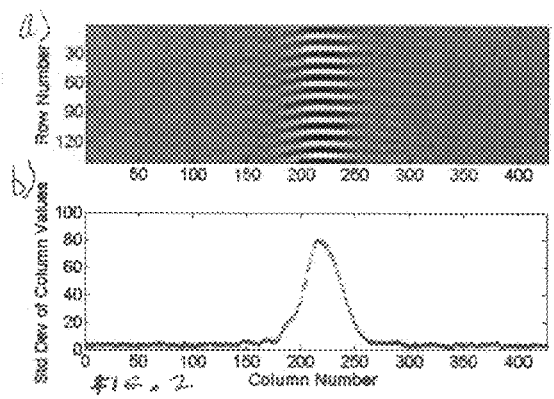
FIG. 2a is a grayscale image from a sample of data from a CMOS camera.
FIG. 2b is a plot of standard deviation versus column number. By finding the center of the standard deviation plot peaks the instrument can pinpoint the height of the focal plane.

Image processing algorithms analyze the camera output to computationally detect the vertical location of the focal plane. The Ronchi grating 10 is oriented such that each column will focus on an independent elevation of the object plane. When the pixels of a column are in focus, they will output high or low intensity values corresponding to the white or black portions of the known object. Conversely, when pixels in a column are out of focus they will output a uniform gray. The standard deviation of the values in each column is used as the metric of focus. The image is high pass filtered to get rid of the vignetting effects. FIG. 2b shows the standard deviation plot of the imagery taken from FIG. 2a. A second order polynomial is fit to the data using a least squares regression. From this fitted data the algorithm can measure the vertical position of the object plane with a resolution of a fraction of a pixel by finding the center of the standard deviation plot peak.

When a flat, transparent object is partially inserted into the field of view the light path becomes split. One portion travels through the object while the other bypasses it. As a result, the light entering the microscope becomes partially focused on a high plane and a low plane. This behavior is observed by the camera by simultaneously displaying two separate peaks of reduced magnitude on the standard deviation plot. By measuring the relative magnitude of both peaks the sensor can determine the lateral position of the transparent object.

Figure 3:
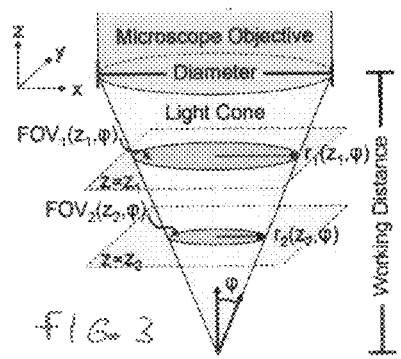
FIG. 3 is a schematic diagram showing the geometry of the FOV assumed in our model. The total area in the FOV is a function of height Z and spread angle $\phi$.

Our theory predicts that the fraction of light focused on the lower plane is proportional to the fraction of the field of view (FOV) occupied by the transparent object. The geometric model assumes the FOV is of circular cross section whose radius varies is a function of height Z and the spread angle φ. This geometry is depicted in FIG. 3. A mathematical model using these physical parameters is derived to calculate the fraction of FOV occupied by the transparent object as a function of its lateral and vertical position.

Figure 4:
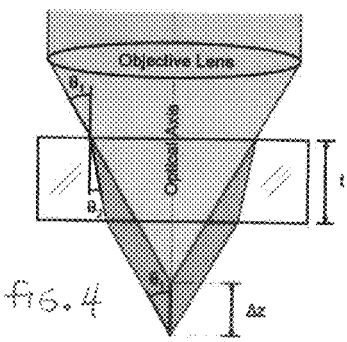
FIG. 4 is a ray tracing diagram showing how a transparent object with thickness t will shift the location of the focal plane a distance $\Delta Z$.

This portion of the patent application mathematically models how the sensor measures the thickness of a transparent object. A ray tracing diagram is shown in FIG. 4 to graphically understand the propagation of the light ray. Assume inside the object the ray bends to an angle $\theta_2$ as per Snell's law. Given the parallel nature of the transparent object the ray exits at the same angle it entered. The ray propagates a distance $\Delta z$ lower than it would have been had it not encountered the transparent object. The following relationship is derived though trigonometry where $\theta_2$ has been solved for in terms of $\theta_1$:

$$\Delta z = t \cdot \left(1 - \frac{\tan(\sin^{-1}(n_1/n_2 \cdot \sin\theta_1))}{\tan\theta_1}\right) \quad (1)$$

As postulated, $\Delta z$ is found to be proportional to the thickness of the transparent object. The remainder of the equation is a function of the incident angle of light $\theta_1$; a variable which is subject to change depending on the orientation of the light. By focusing light through the microscope objective the sensor will collect data from a range of incidence angles. The focal plane shift $\Delta z$ perceived by the camera thus becomes an amalgamation of effects from the entire range of accepted angles. The value of $\Delta z$ is bounded by calculating its minimum and maximum values. At a minimum, $\theta \approx 0$. Using the small angle approximation yields:

$$\Delta z_{minimum} = t \cdot \left(\frac{n_2 - n_1}{n_2}\right) \quad (2)$$

The maximum value for $\theta_1$ can be related to the numerical aperture (NA) of the microscope objective. Making the substitution $\theta_{maximum} = \sin^{-1}(NA)$ it is found:

$$\Delta z_{maximum} = t \cdot \left(1 - \frac{\tan(\sin^{-1}(n_1/n_2 \cdot NA))}{\tan(\sin^{-1}(NA))}\right) \quad (3)$$

The mathematical relationships used to create a lateral position measurement model are now derived. The fraction of FOV occupied by the transparent object is solved for as a function of the object's vertical and lateral position. The coordinate system from FIG. 3 is used where the Z axis lies concentrically with the microscope objective and the X and Y axes lie in the plane defined by the FOV. The radius of the FOV is a function of its elevation and can be expressed in the following terms:

$$r_{FOV} = \tan\phi \cdot z \quad (4)$$

The center of the FOV is defined as the X, Y origin. It is assumed that a long, straight edged, transparent object is introduced into the field of view along the Y axis such that the fraction of the field of view occupied by the object is invariant to the object's X position. Using this coordinate system, Equation 5 expresses the fraction of FOV covered by the transparent object in terms of the transparent object's position in the horizontal (Y) and vertical (Z) axis.

Fraction FOV Covered = (5)

$$\frac{1}{\pi} \cdot \left(\cos^{-1}\left(\frac{y}{\tan\varphi \cdot z}\right) - \frac{y}{\tan\varphi \cdot z} \cdot \sqrt{1 - \left(\frac{y}{\tan\varphi \cdot z}\right)^2}\right)$$

It is postulated that the output of the sensor Ω measured by the camera is proportional to the fraction if FOV covered by the transparent object. Ω is calculated numerically by summing the standard deviation of the values in each column about a center column c. The center column is determined by the image processing algorithm as the column with the largest value of standard deviation. The numerical solution for Ω calculated directly from the intensity values of the captured images is expressed mathematically in (6).

$$\Omega_k = \sum_{j=c-25}^{c+25} \sqrt{\sum_{l=1}^{M}\left(I_{(i,j)} - \sum_{i=1}^{M}\frac{I_{(i,j)}}{M}\right)^2} \quad (6)$$

where M=Number of Rows
I(i,j)=intensity value of pixel in row i, column j
c=Center column of the peak distribution
i=row number
j=column number
k=frame number The physical parameters expressed in these mathematical relationships are based upon a spatial domain oriented by the Cartesian coordinates. The camera observes these changes in the spatial domain in units of pixels. The output of the camera can be related to the physical Cartesian coordinates space by calculating the size of the magnified pixels. A vertical shift in the object plan Δz is related to a lateral shift in columns viewed by the camera ΔP via the following equation.

$$\Delta Z = \frac{p \cdot \tan\alpha}{M} \Delta P \quad (7)$$

Where M=magnification of the microscope objective
P=native size of the camera sensor pixels (m)
α=angle of elevation of the Ronchi Grating Our sensor simultaneously measures thickness and lateral position of a transparent plate. Each measurement is presented independently whereby the thickness is changed while keeping position constant and vice versa. Lastly it is shown how the combination of both measurements can be successfully used to account for changes in the metrology loop.

First, the experimental apparatus used in the laboratory is presented in detail. A Basler A504 high speed camera is used to capture 500 frames per second at a resolution of 1280×1024 pixels. The 12 micron pixel size is magnified fifty fold by a Mitutoyo 50× (NT58-237) Extra Long Working Distance Objective. The camera is held with respect to the microscope objective tube lens (1-62922) by Navitar. An adjustable 0.7 to 1.3× Magnification Navitar Lens (1-60191) provides the flexibility in the optical system. The camera images a Ronchi grating from Edumnd Optic (NT62-203) with a series of lines spaced at 240 line pairs per millimeter. A collimated LED light source purchased from Thor Labs (M405L2) provides 405 nanometer illumination onto the sample. During the experiments to test the effect of lateral position, the transparent glass is positioned by an air bearing stage made by Nelson Air. The stage uses feedback from a Heidenhain non contact optical encoder (LIF481) with a 4 micron pitch and 50× interpolation outputting 20 nanometer resolution. The stage is actuated by a Parker Trilogy 210 Brushless Linear Motor.

Figure 5:
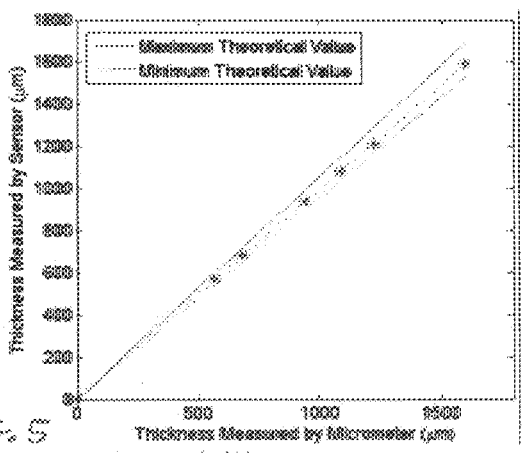
FIG. 5 is a graph of thickness measured by the present sensor against thickness measured by a micrometer. Minimum and maximum values predicted by our theory sandwich the data.

In this experiment our sensor measures the thickness of six microscope slides. All six 3"×1" pieces of glass were generously donated by a representative from Howard Glass in Worchester, Mass. Each slide had a different thickness ranging from 0.599 to 1.699 mm that was first measured by a Mitutoyo micrometer with 2.54 um accuracy. The slides were inserted into the sensor such that they fully covered the field of view of the camera. The image processing algorithms calculated the pixel shift for each slide. The pixel shift measurement taken by our sensor was compared against the thickness measurement taken by the micrometer in FIG. 5. Overlaid upon this figure are the maximum and minimum theoretical values for ΔP derived from our model. The data is presented in tabular form in Table 1.

TABLE 1

The thickness values measured by both instruments are presented in this table. The discrepancy between the measurements is less than the accuracy of the micrometer which is evidence that our sensor has equal if not greater measurement accuracy.

| MIT Sensor (μm) | Micrometer (μm) | Δ Line Fit (μm) | % Diff |
|---|---|---|---|
| 568.1 | 566.4 | −1.68 | 0.29 |
| 680.0 | 680.7 | 0.75 | 0.11 |
| 939.9 | 939.8 | −0.05 | 0.01 |
| 1089.1 | 1087.1 | −2.01 | 0.18 |
| 1221.5 | 1226.8 | 5.33 | 0.43 |
| 1605.2 | 1602.7 | −2.50 | 0.15 |

Figure 6:
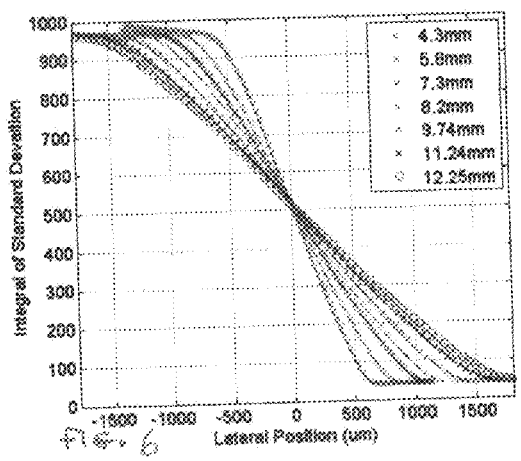
FIG. 6 is a plot of the integral of standard deviation against lateral position. Each curve represents data taken at an independent height as listed in the legend.

The second experiment was designed to test and verify the assumptions made by the lateral positioning model. This experiment measures the output of our sensor as a function of vertical and lateral position of the transparent slide. A transparent slide of 1.067 mm thickness was horizontally drawn across the FOV of the camera in discrete steps of either 25 or 50 microns. The lateral position of the slide was controlled by an air bearing stage with 20 nanometer position resolution. The digital camera was programmed to capture an image of the Ronchi ruling at the end of each step. After the first pass the transparent slide was elevated by a Z stage and passed through the field of view again. This experiment was repeated for seven different elevations. The results of the experiment are compared against the theoretical model in FIG. 6. The solid lines represent the values predicted by the model while the crosses represent the collected data. Each color represents the data collected by the experiment at a different height as prescribed in the legend. After finding the angle φ empirically, the value was applied unilaterally to predict the behavior of the sensor for all seven elevations.

Figure 7:
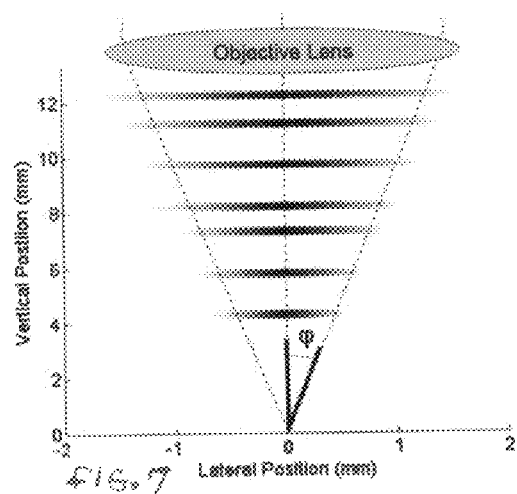
FIG. 7 is a graph of vertical position against lateral position providing a visual representation of the light cone. The same data from FIG. 6 is plotted as a function of vertical and lateral position of the transparent object to show their geometrical relationship.

The results of the experiment are presented in a more intuitive manner in FIG. 7. The purpose of this figure is to visualize the data in a geometric nature. Seven horizontal lines of data are presented. The vertical and lateral position of each data point on the graph represents the position of the transparent glass when the data point was taken. The vertical position is defined as the distance above the object plane. The darkness of the data point represents the change in output per lateral position $\Delta\Omega/\Delta X$. Thus, the data turns white once the transparent object has left the light cone and no longer has an effect on the output of the sensor. The geometry of the light cone can be empirically assessed from this data.

Figure 8:
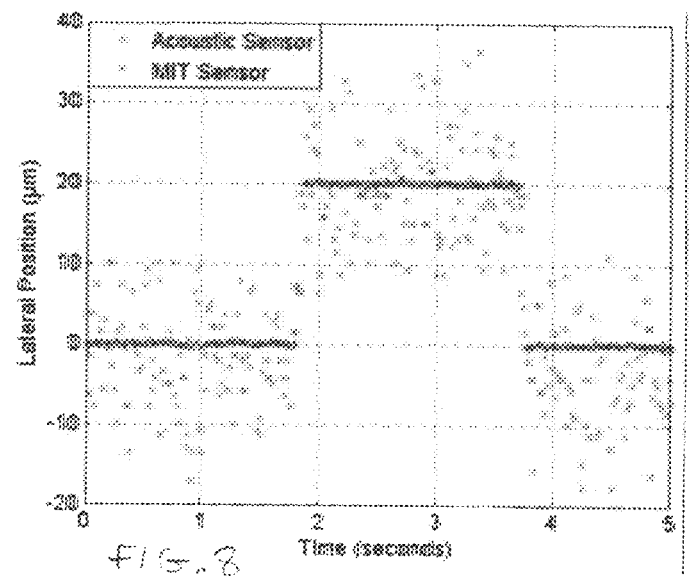
FIG. 8 is a graph of lateral position against time comparing an acoustic position sensor and the instrument disclosed herein to measure a lateral 20 µm step change of a transparent object.

The sensor has demonstrated 0.4 μm resolution measurement on the lateral position of transparent objects. This measurement capability represents a 15 fold increase in resolution over state-of-the-art acoustic sensors. A commercially available acoustic position sensor with the highest states resolution on the market (Re SU m-25) was used to directly compare the performance of both instruments. The air bearing stage was used move a transparent slide of 1.067 mm thickness in 20 μm steps. The data collected by both instruments is presented in FIG. 8.

The effect of thermal drift in the metrology loop can be isolated from our desired thickness measurement by using the difference between both peaks in the standard deviation plot. The sensor reading employs two light paths whereby one travels through the sample and the other travels around it. The portion of light that bypasses the object becomes the reference arm of our measurement. The transparent object's effect on the light path can be isolated by calculating the relative measurement between these two light paths. Any thermal effects on the metrology loop will affect the position of both peaks equally thereby canceling out when subtracting one peak position from the next to find the thickness of the transparent object.

Figure 9:
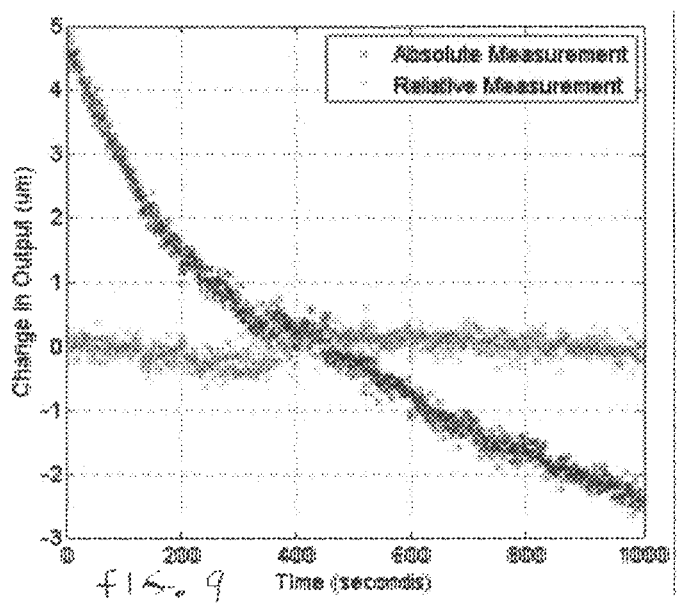
FIG. 9 is a graph of change in output versus time showing the thermal drift of the peak center as a function of time. By subtracting one peak center from the other, one can separate the effects of thermal drift from the thickness measurement.

This principle is demonstrated in FIG. 9 by collecting data on both peaks over a long period of time. A piece of glass was inserted half way into the field of view creating two peaks on the standard deviation graph. The blue data shows the peak position of the first peak while the green shows the difference of the first peak minus the second. The average value of each data set is subtracted from the data to show the drift over time between the relative and absolute measurements. The change in the output of the absolute data is dominated by thermal drift while the change in the output of the relative data is dominated by noise.

The thickness measurements from the micrometer and our sensor output very similar readings. All but one measurement came up within the accuracy tolerance of the micrometer which is suggested to be the greatest source of error. Additionally it is pointed out that the micrometer and light sensor most likely were measurement different points on the same slide. The repeatability of our sensor's thickness measurement was measured to be 0.2 microns.

The data collected from the lateral position measurement strongly supports the model presented in this patent application. As seen from FIG. 7 our measurements indicate a conical shape of the light path, a geometry commensurate with the numerical aperture metric. The numerical aperture of the Motic microscope objective of 0.42 suggests the light cone should propagate outward at an angle of 24.8°. Empirically we measure the spread angle of the light cone φ as it applies to the lateral resolution measurement to be 6.98°.

The data also supports our hypothesis that the fraction of light focused on the lower plane is indeed proportional to the fraction of the FOV occupied by the transparent object. Furthermore, the data suggest that standard deviation of the columns is an accurate measure to predict the fraction of light focused on the lower plane. This is not intuitively evident given the root mean square nature of the standard deviation metric.

The 0.4 micron lateral resolution of our sensor was measured to be 15 times finer than the leading acoustic sensor for measurement of transparent objects. The resolution of this measurement can be enhanced by low pass filtering at the expense of bandwidth. The data presented in FIG. 8 can be collected by a high speed camera at a rate of 500 data points per second. This sampling rate is greater than the 285 Hz sampling rate of the Re sensor. From this data it can be concluded that the novel sensor does indeed have greater resolution.

The numbers in square brackets refer to the references listed herein. The contents of all of these references are incorporated herein by reference in their entirety.

Further details of the invention and experiments conducted with respect thereto may be found in "High Speed Instrumentation for Inspection of Transparent Parts" by Dean Ljubicic, submitted to the Department of Mechanical Engineering in partial fulfillment of the requirements for the degree of Doctor of Philosophy in Mechanical Engineering at the Massachusetts Institute of Technology (February 2013). The contents of this doctoral dissertation are incorporated herein by reference.

It is recognized that modifications and variations of the present invention will be apparent to those of ordinary skill in the art and it is intended that all such modifications and variations be included within the scope of the appended claims.

REFERENCES

[1] Raeymaekers, Bart, and Frank E. Talke. "Measurement and Sources of Lateral Tape Motion: A Review." Journal of Tribology-Transactions of the Asme 131.1 (2009): 011903.

[2] Haque, Md; Winter, Darcy; Hueppelsheuser, Dale; Newton, John; Storie, Greg, "Synthetic Light Sensor for Web-Guiding Apparatus." U.S. Pat. No. 6,323,948, 27 Nov. 2001.

[3] Goldade, A. V., and B. Bhushan. "Measurement and Origin of Tape Edge Damage in a Linear Tape Drive." Tribology Letters 14.3 (2003): 167-80.

[4] Wen K. Ko., "Ultrasonic Edge Detector." U.S. Pat. No. 5,126,946, 30 Jun. 1992.

[5] Haque, Md; Winter, Darcy; Hueppelsheuser, Dale; Newton, John; Storie, Greg, "Ultrasonic Sensor for Web-Guiding Apparatus." U.S. Pat. No. 6,289,729, 18 Sep. 2001.

[6] Seshadri, Aravind, and Prabliakar R. Pagilla. "Design and Development of a New Edge Sensor for Web Guiding." Ieee Sensors Journal 7.5-6 (2007): 698-706.

[7] Coppola, G., et al. "Method for Measuring the Refractive Index and the Thickness of Transparent Plates with a Lateral-Shear, Wavelength-Scanning Interferometer." Applied Optics 42.19 (2003): 3882-7.

[8] Fathi, Mohammad Taghi, and Silvano Donati. "Thickness Measurement of Transparent Plates by a Self-Mixing Interferometer." Optics Letters 35:11 (2010): 1884-6.

[9] Y. Pavan Kumar, and Chatterjee, Sanjib "Thickness Measurement of Transparent Glass Plates using a Lateral Shearing Cyclic Path Optical Configuration Setup and Polarization Phase Shifting Interferometry." Applied Optics 49:33 (2010): 6552-7.

[10] de Groot, P. "Measurement of Transparent Plates with Wavelength-Tuned Phase-Shifting Interferometry." Applied Optics 39.16 (2000): 2658-63.

[11] Mansoor, H., H. Zeng, and M. Chiao. "A Micro-Fabricated Optical Scanner for Rapid Non-Contact Thickness Measurement of Transparent Films." Sensors and Actuators A-Physical 167.1 (2011); 91-6.

[12] Fukano, T., and I. Yamaguchi. "Simultaneous Measurement of Thicknesses and Refractive Indices of Multiple Layers by a Low-Coherence Confocal Interference Microscope." Optics Letters 21.23 (1996): 1942-4.

[13] Ri, Shien, and Takashi Muramatsu. "A Simple Technique for Measuring Thickness Distribution of Transparent Plates from a Sing Image by using the Sampling Moire Method." Measurement Science & Technology 21.2(2010): 025305.

[14] Liu, Chien-Hung, Shien-Chang Yeh, and Hsueh-Liang Huang. "Thickness Measurement Systems for Transparent Plates using Dual Digital Versatile Disc (DVD) Pickups." Applied Optics 49.4(2010):63743.

What is claimed is:

1. System for measuring thickness and lateral position of a transparent object comprising:
   a camera including a sensor or for receiving light the camera including an objective lens for focusing on an object plane and having an optical axis and a field of view;
   a source of light;
   a surface having variations in reflected or transmitted light intensity spaced apart from the objective lens and illuminated by the source of light and disposed at an angle with respect to the optical axis of the objection lens;
   whereby a transparent object disposed fully or partially between the objective lens and the surface will shift the position of the object plane, the shift in object plane being proportional to the thickness of the object, and the transparent object, when partially inserted between the object lens and the surface, will focus a fraction of the light on a second plane, this fraction of light being proportional to the fraction of the lens field of view occupied by the transparent object and related to lateral position.

2. The system of claim 1 wherein the surface is a Ronchi grating.

3. The system of claim 2 wherein the Ronchi grating has an alternating black and white striped pattern.

4. The system of claim 1 further including computing apparatus running image processing algorithms operating on an output of the camera sensor to determine the location of the object plane.

5. The image system of claim 4 wherein the algorithms, when a Ronchi grating column is in focus, will output high or low intensity values corresponding to white or black portions of the grating.

6. The system of claim 5 wherein the algorithms use standard deviation of values in each grating column as a metric of focus.

7. The system of claim 4 wherein the camera displays two separate peaks of reduced magnitude on a standard deviation plot, the relative magnitude of the two peaks determining lateral position of the object.

* * * * *